United States Patent [19]

Duran

[11] Patent Number: 4,828,442
[45] Date of Patent: May 9, 1989

[54] SPRING FORM CAPTIVE PANEL FASTENER ASSEMBLY

[76] Inventor: John A. Duran, 425 Oak Knoll Dr., Glendora, Calif. 91740

[21] Appl. No.: 138,513

[22] Filed: Dec. 23, 1987

[51] Int. Cl.⁴ .............................................. F16B 21/18
[52] U.S. Cl. .................. 411/353; 403/406.1; 403/407.1; 411/112; 411/970
[58] Field of Search ............... 411/353, 103, 107, 112, 411/999, 970, 352; 403/406.1, 407.1, 408.1; 16/2; 227/55; 174/153 G, 138 G, 157

[56] References Cited

U.S. PATENT DOCUMENTS

| | | | |
|---|---|---|---|
| 981,321 | 1/1911 | Smith | 411/320 |
| 994,726 | 6/1911 | Dorman | 411/352 |
| 2,095,098 | 10/1937 | Kyle et al. | 411/999 X |
| 2,179,604 | 11/1939 | Tinnerman | 411/352 |
| 2,700,172 | 1/1955 | Rohe | 411/999 X |
| 2,718,252 | 9/1955 | Schuster | 411/946 |
| 3,037,542 | 6/1962 | Boyd | 411/105 |
| 3,296,765 | 1/1967 | Rohe et al. | 16/2 X |
| 3,436,107 | 4/1969 | Karden | 411/352 X |
| 3,592,250 | 7/1971 | Petroshanoff | 411/320 |
| 3,995,675 | 12/1976 | Cosenza | 151/69 |
| 4,069,855 | 1/1978 | Petroshanoff | 411/999 |
| 4,112,992 | 9/1978 | Wing | 411/946 |
| 4,119,131 | 10/1978 | Cosenza | 411/352 |
| 4,296,586 | 10/1981 | Heurteux | 411/338 X |
| 4,324,517 | 4/1982 | Dey | 411/353 |
| 4,464,090 | 8/1984 | Duran | 411/353 X |
| 4,655,658 | 4/1987 | Gulistan | 411/999 X |
| 4,723,881 | 2/1988 | Duran | 411/353 |
| 4,747,738 | 5/1988 | Duran | 411/107 X |

Primary Examiner—Gary L. Smith
Assistant Examiner—Curtis B. Brueske

[57] ABSTRACT

An integral hold out spring and built-in stop ring is provided on a threaded bolt. The bolt is adapted to be inserted through a hole in a panel. The hold out spring and built-in stop ring is inserted into a bore in the bolt, the hold out spring portion extending out of a slot in the bolt and the built-in stop ring portion entering a groove adjacent the nose of the bolt. In one embodiment of the invention, a washer having inwardly extending tabs is installed on the shank of the bolt prior to insertion of the built-in stop ring portion, the tabs riding in grooves extending along the outer body of the bolt and stopped in their downward movement by engagement with the built-in stop ring portion.

20 Claims, 5 Drawing Sheets

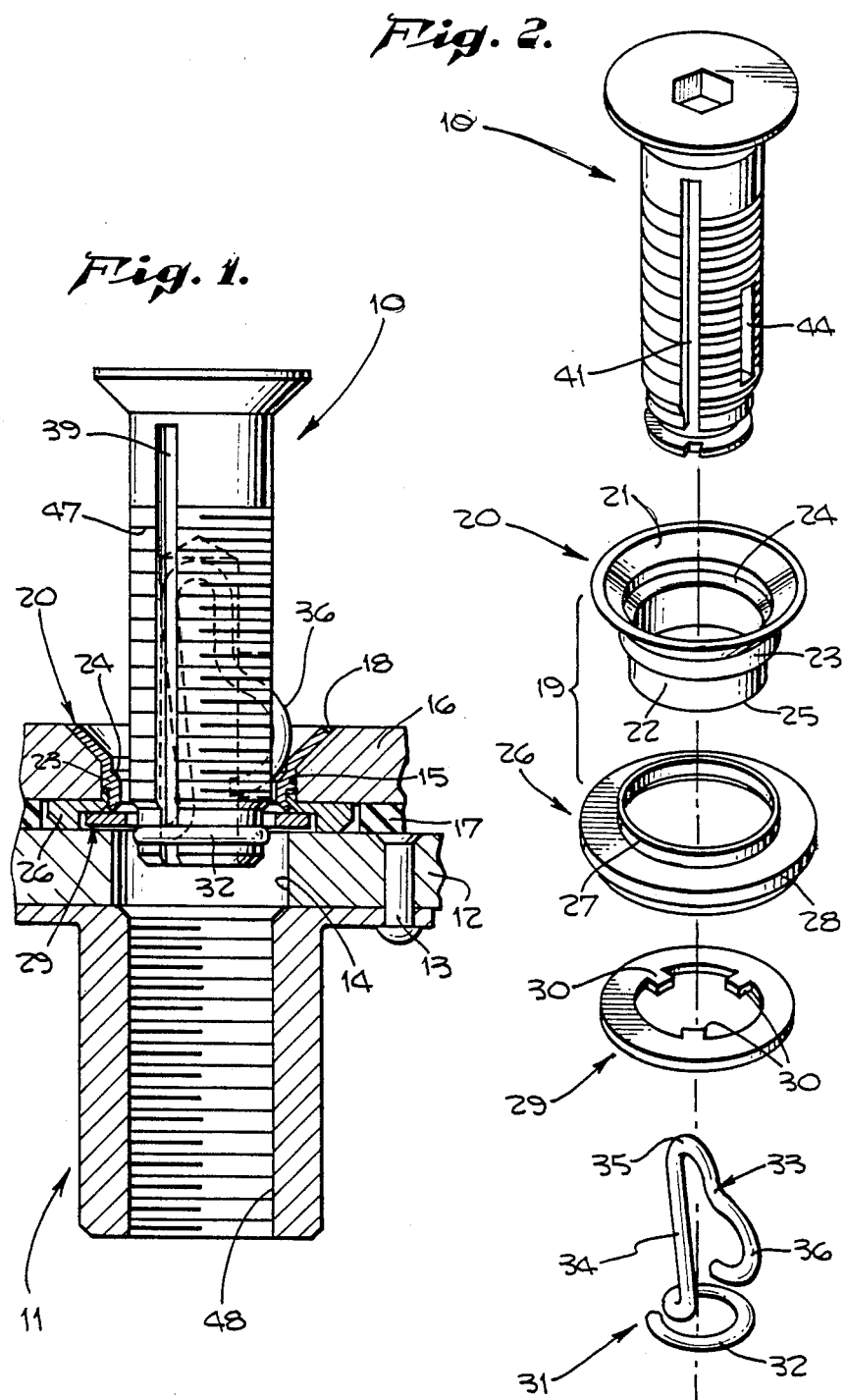

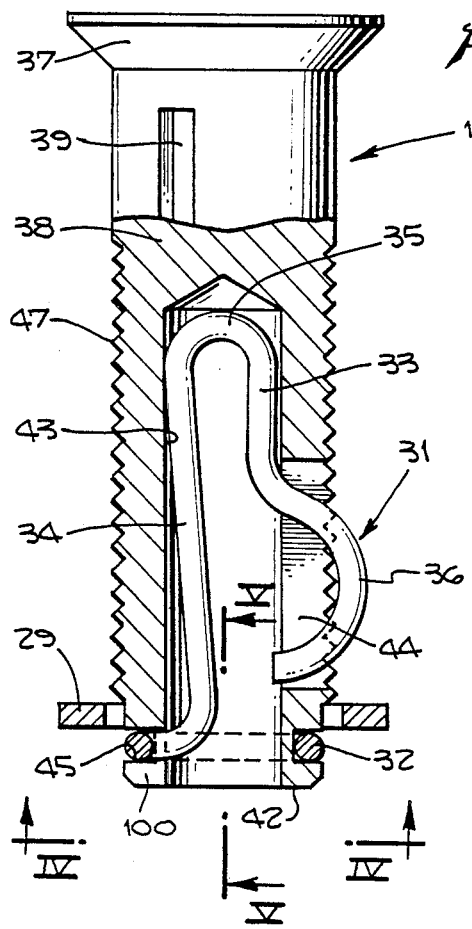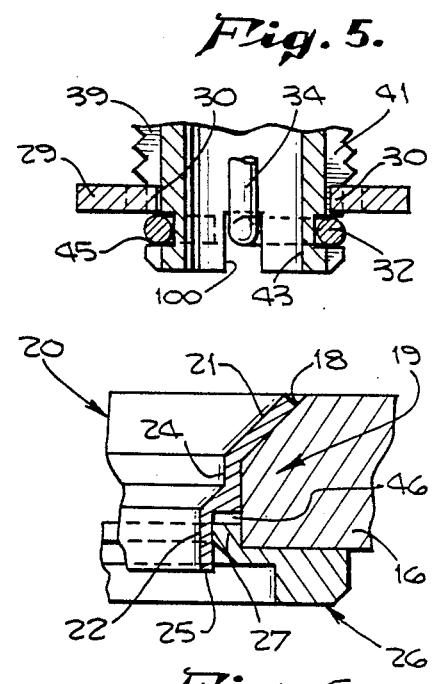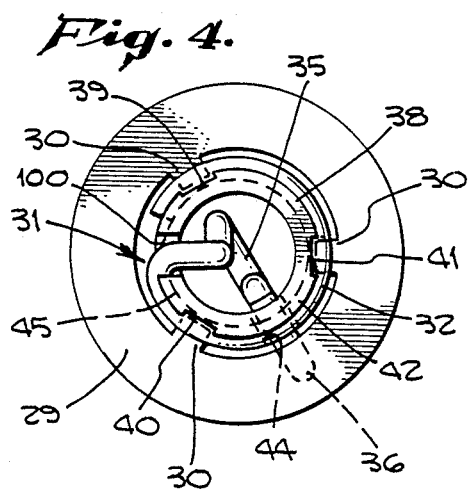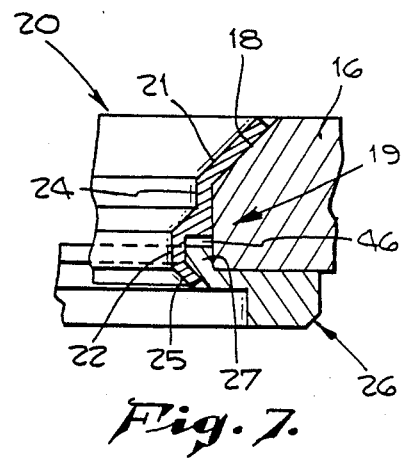

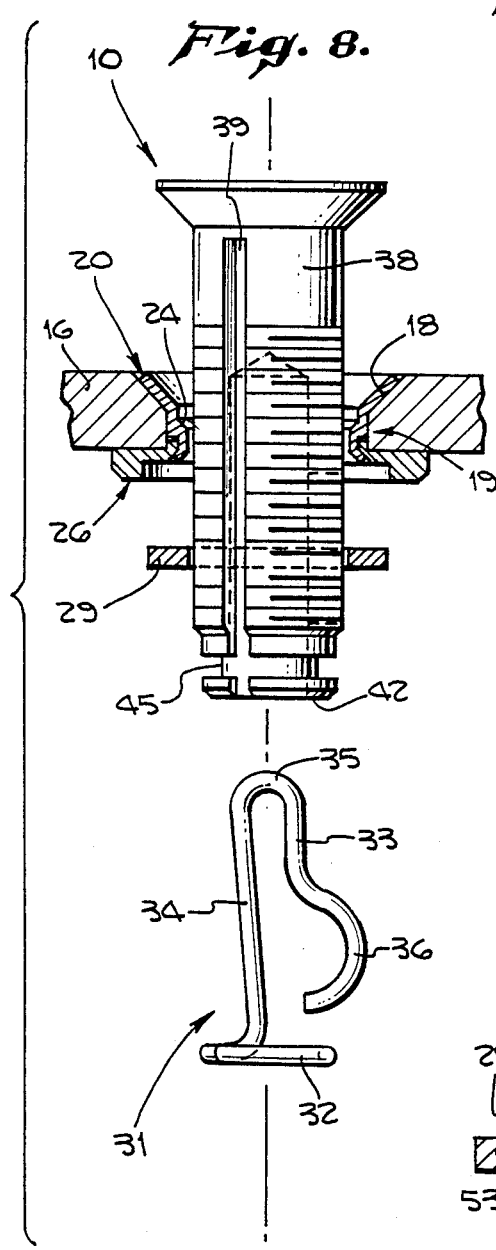
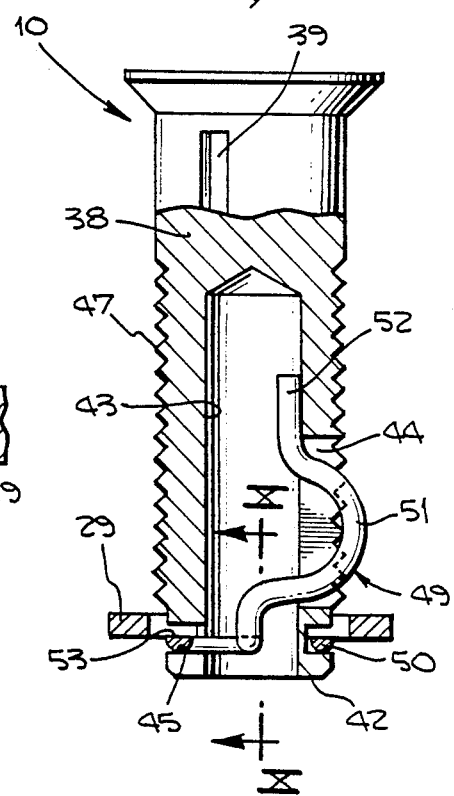
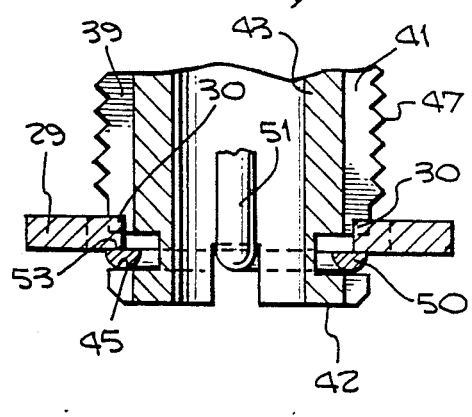

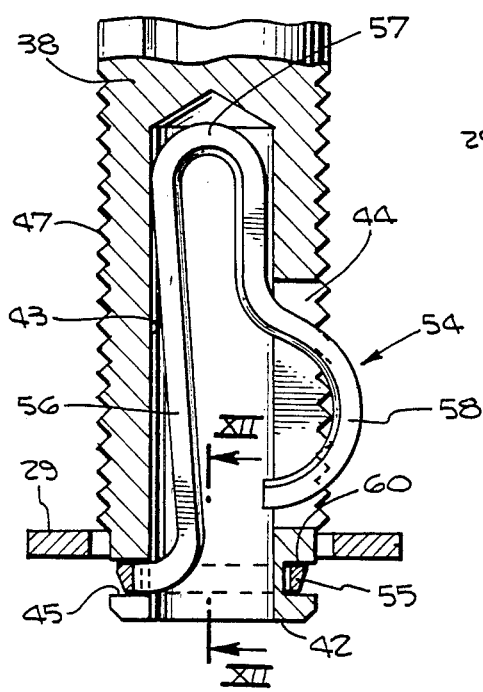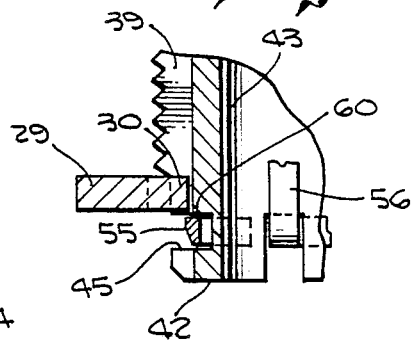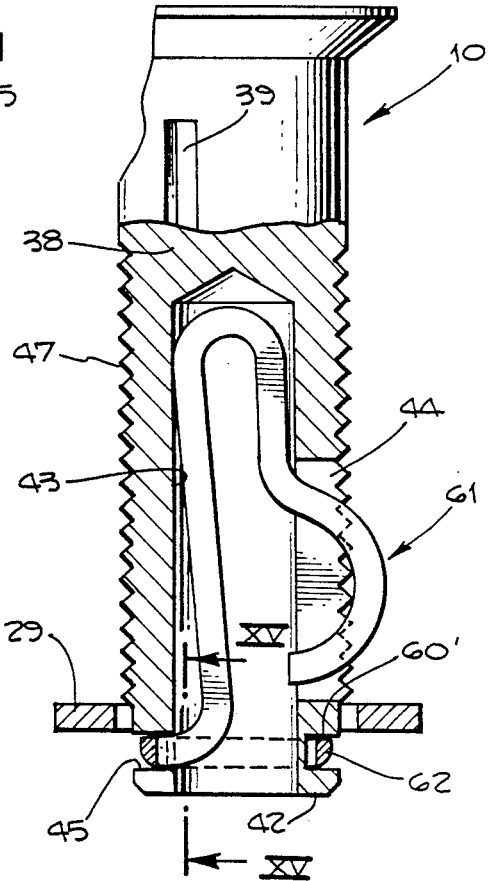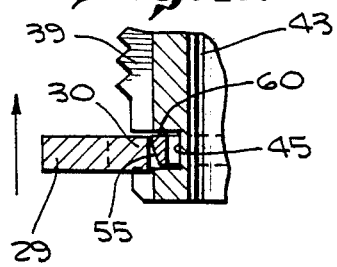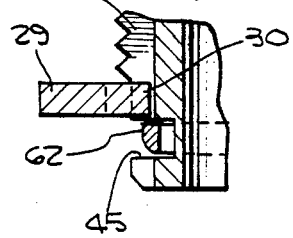

SPRING FORM CAPTIVE PANEL FASTENER ASSEMBLY

BACKGROUND OF THE INVENTION

1. Field of the Invention

The invention relates to panel fasteners; and, more particularly, to captive panel fasteners suitable for securement to aircraft panels or the like.

2. Description of the Prior Art

In U.S. Pat. No. 3,995,675 to Cosenza, there is described a captive panel fastener assembly wherein a retaining ring with inwardly extending tabs slidably ride along the body of a stud, the tabs entering splines extending lengthwise of the stud. A knurled plug is press-fit into a bore at the nose of the stud after insertion of the stud through a hole in a panel and after placement of the ring on the stud. This retains the ring to the stud and allows a more rigid and closely fitting retaining ring to be used as a captivating means of the stud to the panel. The retaining ring is more resistant to accidental displacement than more flexible retaining rings.

However, the knurl of the plug and its outer diameter must be very precisely manufactured and closely related to the bore diameter into which it is inserted. If it is not so precise, e.g., if it is oversized, the plug can blow up or expand the outer threads of the stud and the stud cannot then mate properly with a receptacle secured to a mating panel. If the plug is undersized, it will fall out and may possibly be sucked up into the engine of the aircraft causing serious damage. If it falls out where sophisticated hardware or electronic equipment is present, it may interfere with the same or cause damage thereto.

Further, the plug in U.S. Pat. No. 3,995,675 has an enlarged shoulder or stop portion which abuts against the area surrounding the bore opening. If this portion is not perfectly concentric with the shaft of the stud, it might interfere with the minor diameter of the thread of the stud and a nut or receptacle would not be able to threadably mate with the stud. Finally, in installing the plug in U.S. Pat. No. 3,995,675, a large axial force is necessary to install the knurled barrel portion all the way into the bore hole.

There is thus a need for a captive panel fastener that allows the use of rigid and close fitting retaining rings on bolts or studs which captivate the bolt or stud to a panel without a separate plug or without means that might fall out or interfere with the outer threads of the bolt or stud.

SUMMARY OF THE INVENTION

It is an object of this invention to provide a captivated bolt retaining ring which will not become displaced after installation and is rigid and close fitting to the bolt.

It is a further object of this invention to provide a retaining ring on such panel fastener which can be installed without deformation of the threads of the bolt.

It is another object of this invention to provide a retaining ring captivated to the bolt by an integral part of the hold out means of the bolt.

It is still another object of this invention to provide a retaining ring captivated to a bolt without any parts that can become lost, fall out or interfere with the bolt outer threads.

These and other objects are preferably accomplished by providing an integral hold out spring and built-in stop ring on a threaded bolt. The bolt is adapted to be inserted through a hole in a panel. The hold out spring and built-in stop ring is inserted into a bore in the bolt, the hold out spring portion extending out of a slot in the bolt and the built-in stop ring portion entering a groove adjacent the nose of the bolt. A washer having inwardly extending tabs is now installed on the shank of the bolt over the built-in stop ring portion, the tabs riding in grooves extending along the outer body of the bolt and stopped in their downward movement by engagement with the built-in stop ring portion.

BRIEF DESCRIPTION OF THE DRAWING

FIG. 1 is an elevational view, partly in crosssectional, showing the bolt captivated to a panel;

FIG. 2 is an exploded view of the bolt assembly and grommet assembly of FIG. 1;

FIG. 3 is an elevational view, partly in section, of the bolt assembly alone of FIG. 1;

FIG. 4 is a view taken along lines IV—IV of FIG. 3;

FIG. 5 is a view taken along lines V—V of FIG. 3;

FIG. 6 is an elevational view, partly in section, of the panel 16 alone of FIG. 1 showing the assembly of the grommet assembly thereto;

FIG. 7 is a view similar to FIG. 6 showing the swaging of the lower grommet portion to the upper grommet portion;

FIG. 8 is an elevational exploded view, partly in section, illustrating the assembly of the bolt, washer and spring to panel 16 after installation of the grommet assembly;

FIG. 9 is a view similar to FIG. 3 showing a modified hold out spring in accordance with the invention;

FIG. 10 is a view taken along lines X—X of FIG. 9;

FIG. 11 is a view similar to FIG. 3 showing another embodiment of a hold out spring in accordance with the teachings of the invention;

FIG. 12 is a view taken along lines XII—XII of FIG. 11;

FIG. 13 is a sectional view illustrating the assembly of ring 29 to the bolt assembly of FIG. 11;

FIG. 14 is a view similar to FIG. 3 showing still another embodiment of a hold out spring in accordance with the invention; and FIG. 15 is a view taken along lines XV—XV of FIG. 14.

DESCRIPTION OF THE PREFERRED EMBODIMENT

Figure 16:
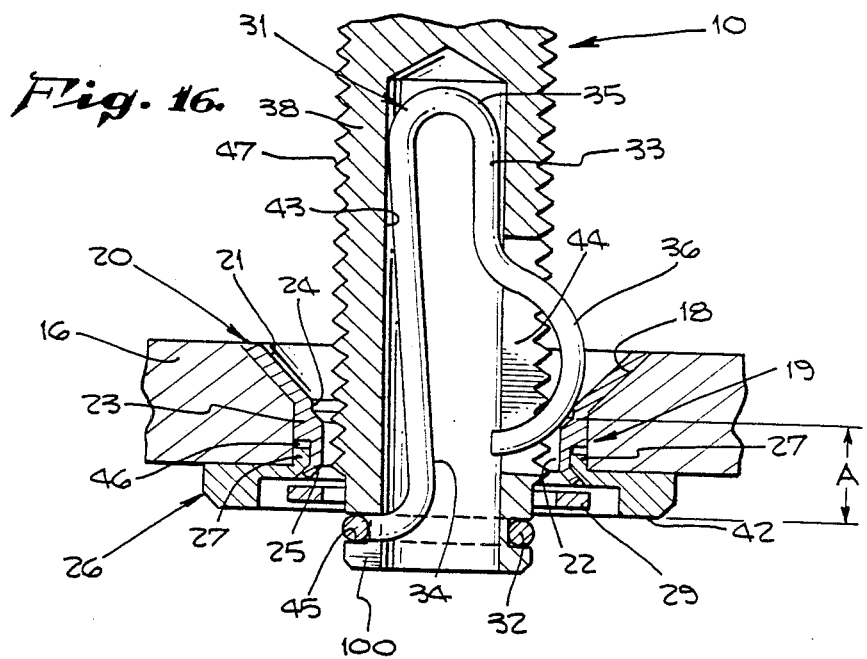
FIG. 16 is an elevational view similar to a portion of the apparatus in the apparatus FIG. 1.

Referring now to FIG. 1 of the drawing, a bolt 10 is shown adapted to mate with a receptacle assembly 11. Receptacle assembly 11 may be of any suitable type, as for example, the assembly 12 described in my copending application Ser. No. 927,320, filed Nov. 4, 1986, now pending, the teachings of which are incorporated herein by reference. Receptacle assembly 11 herein is secured to subpanel 12 by rivets 13 or the like. A hole 14 is provided in subpanel 12 coincident with a hole 15 in main panel 16 and a resilient gasket 17 may optionally be provided between panels 12 and 16.

As seen in FIG. 1, a tapered countersink 18 leads into opening 15 in panel 16. As seen in FIG. 2, a two piece grommet assembly 19 is provided. First upper portion 20 has a conically shaped portion 21 and an integral lower generally cylindrical portion 22. An enlarged area 23 surrounds the exterior of upper portion 20 between portions 21 and 22 and an annular cut-out area 24 (see also FIG. 1) is provided on the inner wall of upper portion 20 at the intersection of portions 21 and 23. It can be seen in FIG. 2 that grommet portion 20 terminates at bottom in a thin-walled end 25.

Grommet assembly 19 further includes a lower grommet portion 26 having an upper generally cylindrical portion 27 and a lower generally enlarged portion 28.

A rigid retaining ring 29 is provided having a plurality, such as three, of inwardly extending tabs or ears 30. A hold out spring 31 is provided, of generally a single piece of spring material, having a lower generally circular ring portion 32 with an upwardly extending upper portion 33. Upper portion 33 extends first upwardly at portion 34 from a point integral with ring portion 32, then curves back on itself at first curved portion 35, then curves outwardly and back inwardly to form a second curved portion 36.

Bolt 10 is best shown in FIG. 3 wherein bolt 10 has a tapered enlarged heat 37, an elongated shank 38, and a plurality, such as three, of spaced elongated slots 39-41 (see also FIGS. 2 and 4). It is noted that slots 39 to 41 extend from a point adjacent the underside of head 37 all the way along and through the bolt shank 38 through tapered nose 42 thereof. Bolt shank 38 is bored out in the interior to form a cavity 43 and a through slot 44 is provided through the wall of shank 38. An annular groove 45 is provided adjacent nose 42. A slot 100 (FIGS. 4 and 5) is provided through the wall of bolt 10 adjacent nose 42. The assembly of the components of FIG. 2 will now be described. As seen in FIG. 6, upper grommet portion 20 is inserted into hole 15 in panel 16 from the access side thereof and lower grommet portion 26 is inserted from the blind side with upper portion 27 disposed in the area formed between lower cylindrical portion 22 and the walls of panel 16 forming opening 15. As seen in FIG. 7, end 25 of lower portion 22 is swaged against portion 27 to securely hold the grommet assembly 19 to panel 16. The spacing or area 46 between portions 23 and 26 (FIGS. 6 and 7) allows for varying panel thicknesses.

As seen in FIG. 8, bolt 10 is inserted through grommet assembly 19 and washer 29 is now assembled to the shank 38 of bolt 10 by merely placing washer 29 onto bolt 10 with tabs or ears 30 riding in slots 39 to 41. Spring 31 is now inserted into bore 43 passing through slot 100 until retaining ring portion 32 snaps into groove 45 and curved portion 36 snaps out of slot 44 as seen in FIG. 3. The final assembled position is shown in FIG. 1. It can be seen that the curved portion 36 of resilient spring 31 rests into the cut-out area 24 of grommet assembly 19 thus holding bolt 10 in an out position with respect to panel 16. Bolt 10 can be merely pushed with spring 31 moving inwardly so that the outer threads 47 of bolt 10 can mate with the internal threads 48 of receptacle assembly 11 as is well known in the art. Washer 29 is stopped in its downward movement by its engagement with ring portion 32 (see also FIG. 5).

It can thus be seen that hold out means and a retaining member for the washer is provided for both holding bolt 10 out from panel 16 and washer retaining 29 to the bolt 10 without any additional parts.

Cut-out area 24 is thus a counterbore into which spring 36 detents into when installed. In order to standardize spring 36 and its location in bolt 10, area 24 will always remain in the same position in relation to the blind side of panel 16. That is, area 24 and grommet portion 20 will vary in thickness depending upon the thickness of panel 16. However, a constant dimension is maintained between the depth of area 24 and the terminal flat bottom of the lower flat bottom of grommet portion 26.

Figure 17:
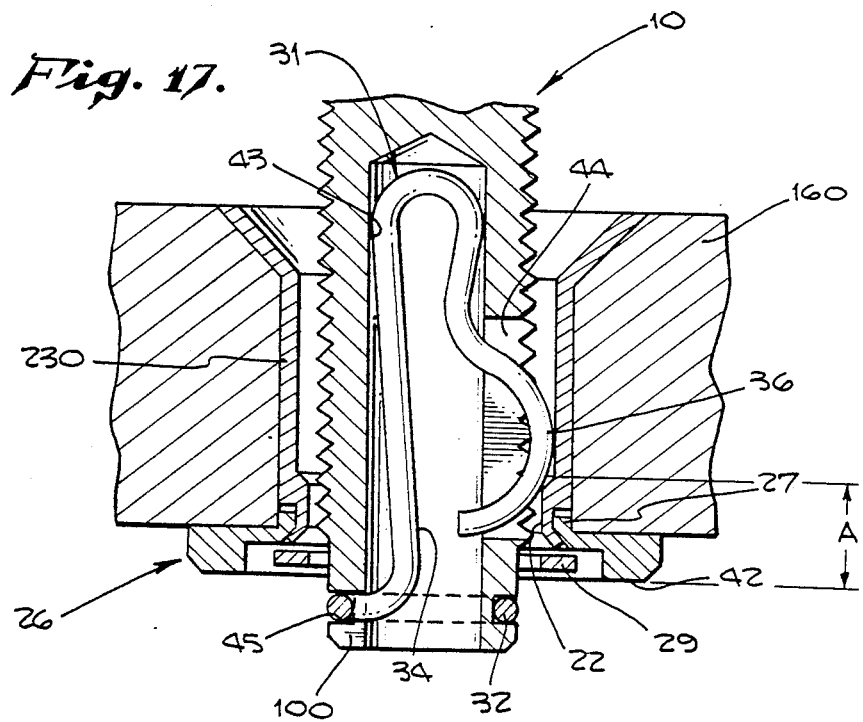
FIG. 17 is a view similar to FIG. 16 showing the apparatus of FIG. 16 installed on a thicker panel.

Thus, as seen in FIG. 16, a distance A is shown between counterbore of area 24 and the bottom of portion 28. However, if a thicker main panel is used, such as panel 160 in FIG. 17 wherein like numerals refer to like parts of FIG. 16, the portion 230 is made longer than portion 23 to accommodate the increased thickness of panel 160 while the distance A remains the same allowing standardization of the spring 36 and its location. This constant dimension ensures a proper detent force on spring 36. Gap 46 (FIG. 6) as heretofore discussed compensates for variation in the panel thickness.

Although a particular type of hold out spring has been disclosed, which may be circular in cross-section throughout, as seen in FIG. 9, wherein the like numerals refer to like parts of the embodiment of FIGS. 1 to 8, a hold out spring 49 is shown having an integral retainer ring portion 50, which is semi-circular in crosssection, and an upwardly extending integral portion which curves first outwardly to form curved portion 51, then returns to a vertical straight integral portion 52 abutting against the inner wall of cavity 43. As seen in FIG. 10, washer 29 abuts against the flat upper surface 53 of ring portion 50. The assembly of spring 49 to bolt 10 is identical to the assembly of spring 31 to bolt 10 described with respect to the embodiment of FIGS. 1 to 8, and to the installed grommet assembly 19, so further discussion is deemed unnecessary.

Although in both embodiments of FIGS. 1 to 8, and FIG. 9, the hold out springs 31 and 49 are installed after installation of washer 29, it is possible to install the washer after installation of the hold out spring while retaining the benefits of the integral retaining ring portion. This is shown in FIG. 11 wherein again like numerals refer to like parts of the embodiment of FIGS. 1 to 8. In this embodiment, hold out spring 54 is shown again having an integral retaining ring portion 55, an integral upwardly extending portion 56, an integral first curved top portion 57, and a second curved portion 58 which functions as a hold out means similar to curved portions 36 and 51. As seen in FIG. 11, the material comprising spring 54 is a wire form material having a cross-section forming an outer tapered wall at ring portion 55. In assembling washer 29 and spring 54 to bolt 10 of FIG. 11, the spring 54 can be installed first in the manner previously discussed with curved portion 58 exiting slot 44 and retaining ring portion 55 snapping into groove 45. Washer 29 can now be installed by sliding over tapered surface 59, (see FIG. 13) the flat upper surface 60 providing as top for washer 29 (FIG. 12).

As seen in FIG. 14, wherein like numerals refer to like parts of the embodiment of FIG. 11, spring 61 is identical to spring 54 except that is is rounded in cross-section at the bottom forming an outer rounded surface 62. Washer 29 moves over this rounded area and tabs or ears 30 enter slots 39-41 as heretofore discussed, the downward movement of washer 29 being arrested by engagement with flat surface 60' (FIG. 15). In the embodiments of FIGS. 11 and 14, the inherent resiliency of retaining ring portion 55 allows the same to move slightly inwardly, as seen in FIG. 13, then spring back out as washer 29 moves therepast.

In all embodiments, the washer 29 can be a rigid and close fitting washer and is retained to the bolt 10 by engagement with a retaining ring portion that is an integral portion of the hold out means of the hold out spring. There is no need to machine grooves or slots that must terminate at some point along the bolt body; grooves or slots 39 to 41 extend all the way through the nose of the bolt.

The unique two piece grommet assembly compensates for varying door or panel thicknesses and is swaged against itself, not directly against the door or panel. This is particularly important in doors or panels of composite materials where stress thereon is to be avoided. The washer is engaged with the bolt slots by merely sliding the same thereon without need of special tools. The integral ring portion on all embodiments of the hold out spring retains the washer to the bolt. The cut-out area of the unique two piece grommet assembly, which compensates for varying door or panel thicknesses, provides an area into which the curved portion of the hold out spring rests allowing proper engagement therewith. No added parts for retaining the washer to the bolt-spring assembly are required.

Although there is described certain embodiments of the invention, the invention is not to be limited to the particular embodiments described but only to the scope of the invention set forth in the appended claims.

I claim:

1. In a captive panel fastener assembly comprising a bolt having an enlarged head at one end and a nose at the other end, a threaded shank on said bolt between said nose and said head, the improvement comprising:
   a plurality of slots extending along said shank through the nose of said bolt;
   a rigid washer having a plurality of inwardly extending tabs riding in said slots, the total number thereof being related to the total number of said slots;
   an annular groove in said bolt adjacent the nose of said bolt and extending into the path of said slots;
   an internal bore in said bolt extending from said nose to a point remote from said head;
   a bore slot in the wall of said bore communicating the interior of said bore with the exterior of said bolt; and
   a hold out spring having a ring portion snap fitting into said groove with an integral curved portion extending out of said bore slot beyond the outer surface of said bolt, the downward movement of said washer off of said bolt being arrested by engagement of said washer with said ring portion.

2. In the assembly of claim 1 wherein said spring has an upwardly extending vertical portion extending from said ring portion abutting against the inner wall of said bore, a first curved portion curved upwardly from said vertical portion, then in a direction generally normal to said vertical portion, then in a direction generally parallel to said vertical portion and spaced therefrom and downwardly and outwardly to form said first-mentioned curved portion.

3. In the assembly of claim 2 wherein said spring is circular in cross-section.

4. In the assembly of claim 1 wherein said spring has an integral portion extending upwardly from said ring portion then curving outwardly of said bore and then back inwardly into the interior of said bore to form said curved portion, then upwardly and vertically forming a vertical portion abutting against the inner wall of said bore.

5. In the assembly of claim 4 wherein said spring is semi-circular in cross-section at said ring portion forming a flat horizontal surface against which said washer abuts.

6. In the assembly of claim 1 wherein said ring portion terminates at an outer peripheral tapered surface adjacent said nose, said ring portion also having an upper flat horizontal surface against which said washer abuts.

7. In the assembly of claim 6 wherein said spring includes an upwardly extending vertical portion extending from said ring portion abutting against the inner wall of said bore, a first curved portion curving upwardly from said vertical portion, then in a direction generally normal to said vertical portion, then in a direction generally parallel to said vertical portion and spaced therefrom and then downwardly and outwardly to form said first-mentioned curved portion.

8. In the assembly of claim 1 wherein said ring portion terminates at an outer peripheral rounded surface adjacent said nose, said ring portion also having an upper flat horizontal surface against which said washer abuts.

9. In the assembly of claim 8 wherein said spring includes an upwardly extending vertical portion extending from said ring portion abutting against the inner wall of said bore, a first curved portion curving upwardly from said vertical portion, then in a direction generally normal to said vertical portion, then in a direction generally parallel to said vertical portion and spaced therefrom and then downwardly and outwardly to form said first-mentioned curved portion.

10. In a captive panel fastener assembly mounted in a grommet assembly mounted in a hole through a panel, the panel having an access side and a blind side and a countersink on the access side thereof, said grommet assembly having an outwardly flared tapered portion conforming to said hole and a bolt having an enlarged head with a tapered portion conforming to said tapered portion of said grommet assembly, and a threaded shank extending from said head terminating in a nose, the improvement comprising:
   a plurality of slots extending along said shank through the nose of said bolt;
   a rigid washer having a plurality of inwardly extending tabs riding in said slots, the total number thereof being related to the total number of said slots;
   an annular groove in said bolt adjacent the nose of said bolt and extending into the path of said slots;
   an internal bore in said bolt extending from said nose to a point remote from said head;
   a bore slot in the wall of said bore communicating the interior of said bore with the exterior of said bolt;
   a hold out spring having a ring portion snap fitting into said groove with an integral curved portion extending out of said bore slot beyond the outer surface of said bolt adapted to bear against said grommet assembly when the head of said bolt is pulled away from said panel, said washer being disposed between said curved portion and said ring portion, and adapted to abut against the portion of said grommet assembly on the blind side of said panel, the downward movement of said washer off of said bolt being arrested by engagement of said washer with said ring portion.

11. In the assembly of claim 10 wherein said spring has an upwardly extending vertical portion extending from said ring portion abutting against the inner wall of said bore, a first curved portion curving upwardly from said vertical portion, then in a direction generally normal to said vertical portion, then in a direction generally parallel to said vertical portion and spaced therefrom and then downwardly and outwardly to form said first-mentioned curved portion.

12. In the assembly of claim 11 wherein said spring is circular in cross section.

13. In the assembly of claim 10 wherein said spring has an integral portion extending upwardly from said ring portion then curving outwardly of said bore and then back inwardly into the interior of said bore to form said curved portion, then upwardly and vertically forming a vertical portion abutting against the inner wall of said bore.

14. In the assembly of claim 13 wherein said spring is semi-circular in cross-section at said ring portion forming a flat horizontal surface against which said washer abuts.

15. In the assembly of claim 10 wherein said ring portion terminates at an outer peripheral tapered surface adjacent said nose, said ring portion also having an upper flat horizontal surface against which said washer abuts.

16. In the assembly of claim 15 wherein said spring includes an upwardly extending vertical portion extending from said ring portion abutting against the inner wall of said bore, a first curved portion curving upwardly from said vertical portion, then in a direction generally normal to said vertical portion, then in a direction generally parallel to said vertical portion and spaced therefrom and then downwardly and outwardly to form said first-mentioned curved portion.

17. In the assembly of claim 10 wherein said ring portion terminates at an outer peripheral rounded surface adjacent said nose, said ring portion also having an upper flat horizontal surface against which said washer abuts.

18. In the assembly of claim 17 wherein said spring includes an upwardly extending vertical portion extending from said ring portion abutting against the inner wall of said bore, a first curved portion curving upwardly from said vertical portion, then in a direction generally normal to said vertical portion, then in a direction generally parallel to said vertical portion and spaced therefrom and then downwardly and outwardly to form said first-mentioned curved portion.

19. In the assembly of claim 10 wherein said grommet assembly is a two piece assembly, having a first upper portion and a second lower portion, the first upper portion having said tapered portion thereon and the second lower portion having an upper surface and an undercut area in which said washer is disposed abutting against the underside thereof, said first upper portion having a thin walled portion extending downwardly from said tapered portion swaged against said second lower portion, the panel being trapped between said outwardly flared tapered portion and the upper surface of said second lower portion thereby compensating for differing panel thicknesses.

20. In the assembly of claim 10 wherein said grommet assembly is counterbored on the inner surface on which said curved portion bears.

* * * * *

UNITED STATES PATENT AND TRADEMARK OFFICE
CERTIFICATE OF CORRECTION

PATENT NO. : 4,828,442
DATED : May 9, 1989
INVENTOR(S) : John A. Duran

It is certified that error appears in the above-identified patent and that said Letters Patent is hereby corrected as shown below:

Page 1, left column, add numbered paragraph 73 as follows:

-- [73] ASSIGNEE: AVIBANK MFG., INC., Burbank, Calif. --.

Signed and Sealed this

Twelfth Day of December, 1989

Attest:

JEFFREY M. SAMUELS

Attesting Officer  Acting Commissioner of Patents and Trademarks